(12) United States Patent
Hagi (10) Patent No.: US 11,745,674 B2
(45) Date of Patent: Sep. 5, 2023

(54) WIRE HARNESS WITH EXTERIOR TUBE, FIRST PROTECTIVE BODY AND SECOND PROTECTIVE BODY

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Masahiro Hagi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 279 days.

(21) Appl. No.: 17/297,212

(22) PCT Filed: Oct. 1, 2019

(86) PCT No.: PCT/JP2019/038799
§ 371 (c)(1),
(2) Date: May 26, 2021

(87) PCT Pub. No.: WO2020/110457
PCT Pub. Date: Jun. 4, 2020

(65) Prior Publication Data
US 2022/0024394 A1 Jan. 27, 2022

(30) Foreign Application Priority Data
Nov. 27, 2018 (JP) .................................. 2018-221115

(51) Int. Cl.
*B60R 16/02* (2006.01)
*H01B 7/18* (2006.01)
*H02G 3/04* (2006.01)

(52) U.S. Cl.
CPC ....... *B60R 16/0215* (2013.01); *H01B 7/1865* (2013.01); *H02G 3/0406* (2013.01)

(58) Field of Classification Search
CPC . B60R 16/0215; H01B 7/1865; H02G 3/0406
(Continued)

(56) References Cited

U.S. PATENT DOCUMENTS 9,522,640 B2 12/2016 Kanagawa
10,618,477 B2 4/2020 Hagi et al.
(Continued)

FOREIGN PATENT DOCUMENTS

JP 2008-077885 A 4/2008
JP 2016-054030 A 4/2016
(Continued)

OTHER PUBLICATIONS

Dec. 24, 2019 Search Report issued in International Patent Application No. PCT/JP2019/038799.

*Primary Examiner* — Timothy J Thompson
*Assistant Examiner* — Michael F McAllister
(74) *Attorney, Agent, or Firm* — Oliff PLC (57) ABSTRACT

A wire harness including: a plurality of electric wires; an exterior tube that has an internal space into which the plurality of electric wires are inserted; a first protective body that is insulative, is provided between the plurality of electric wires in the internal space of the exterior tube, and is formed with an insulating reinforced fiber; and a second protective body that is provided so as to fill a gap between an inner circumferential surface of the exterior tube and outer circumferential surfaces of the plurality of electric (Continued)

wires, and covers an outer circumference of the first protective body and outer circumferences of the plurality of electric wires, wherein the first protective body is shorter than the second protective body in a side view of the wire harness.

10 Claims, 7 Drawing Sheets

(58) Field of Classification Search
    USPC .................................................... 174/70 A
    See application file for complete search history.

(56) References Cited

U.S. PATENT DOCUMENTS

2017/0349122 A1  12/2017  Yanazawa et al.
2019/0299885 A1  10/2019  Hagi

FOREIGN PATENT DOCUMENTS

| JP | 2017-221018 A | | 12/2017 |
| JP | 2017221018 | * | 12/2017 |
| JP | 2018-037260 A | | 3/2018 |
| WO | 2018/116807 A1 | | 6/2018 |

* cited by examiner

WIRE HARNESS WITH EXTERIOR TUBE, FIRST PROTECTIVE BODY AND SECOND PROTECTIVE BODY

BACKGROUND

The present disclosure relates to a wire harness.

Conventionally, wire harnesses used in vehicles such as hybrid vehicles or electric vehicles include electric wires for electrically connecting high-voltage batteries and electric devices such as inverters (for example, see JP 2016-54030A and JP 2018-37260A. In such a wire harness, a plurality of electric wires are collectively covered by an exterior member such as a corrugated tube or a metal pipe for the purpose of protecting the electric wires.

SUMMARY

The above-described wire harness may be routed under the floor of a vehicle and exposed to the outside. Furthermore, the electric wires in this wire harness may be led out from one end of the exterior member and attached to the vehicle such that the electric wires are partially exposed to the outside. In such a case, there is the risk of a foreign object such as sand entering a gap between the exterior member and the electric wires from one end of the exterior member. The electric wire may be damaged if a foreign object such as sand enters a gap between the exterior member and the electric wires.

An exemplary aspect of the disclosure provides a wire harness that can desirably protect electric wires.

A wire harness according to an exemplary aspect includes a plurality of electric wires; an exterior tube that has an internal space into which the plurality of electric wires are inserted; a first protective body that is insulative, is provided between the plurality of electric wires in the internal space of the exterior tube, and is formed with an insulating reinforced fiber; and a second protective body that is provided so as to fill a gap between an inner circumferential surface of the exterior tube and outer circumferential surfaces of the plurality of electric wires, and covers an outer circumference of the first protective body and outer circumferences of the plurality of electric wires, wherein the first protective body is shorter than the second protective body in a side view of the wire harness.

The wire harness according to the present disclosure achieves an advantageous effect in that it is possible to desirably protect electric wires.

DETAILED DESCRIPTION OF EMBODIMENTS

The following describes an embodiment with reference to the accompanying drawings. Note that, in the accompanying drawings, some of the components may be exaggerated or simplified for the sake of convenience of description. The dimensional ratios of the components may also be different from the actual dimensional ratios thereof. Also, in cross-sectional views, a dotted pattern is shown instead of the hatching of some members, and thus the hatching of some members is omitted in order to clarify the respective cross-sectional structures of the members.

Figure 1:
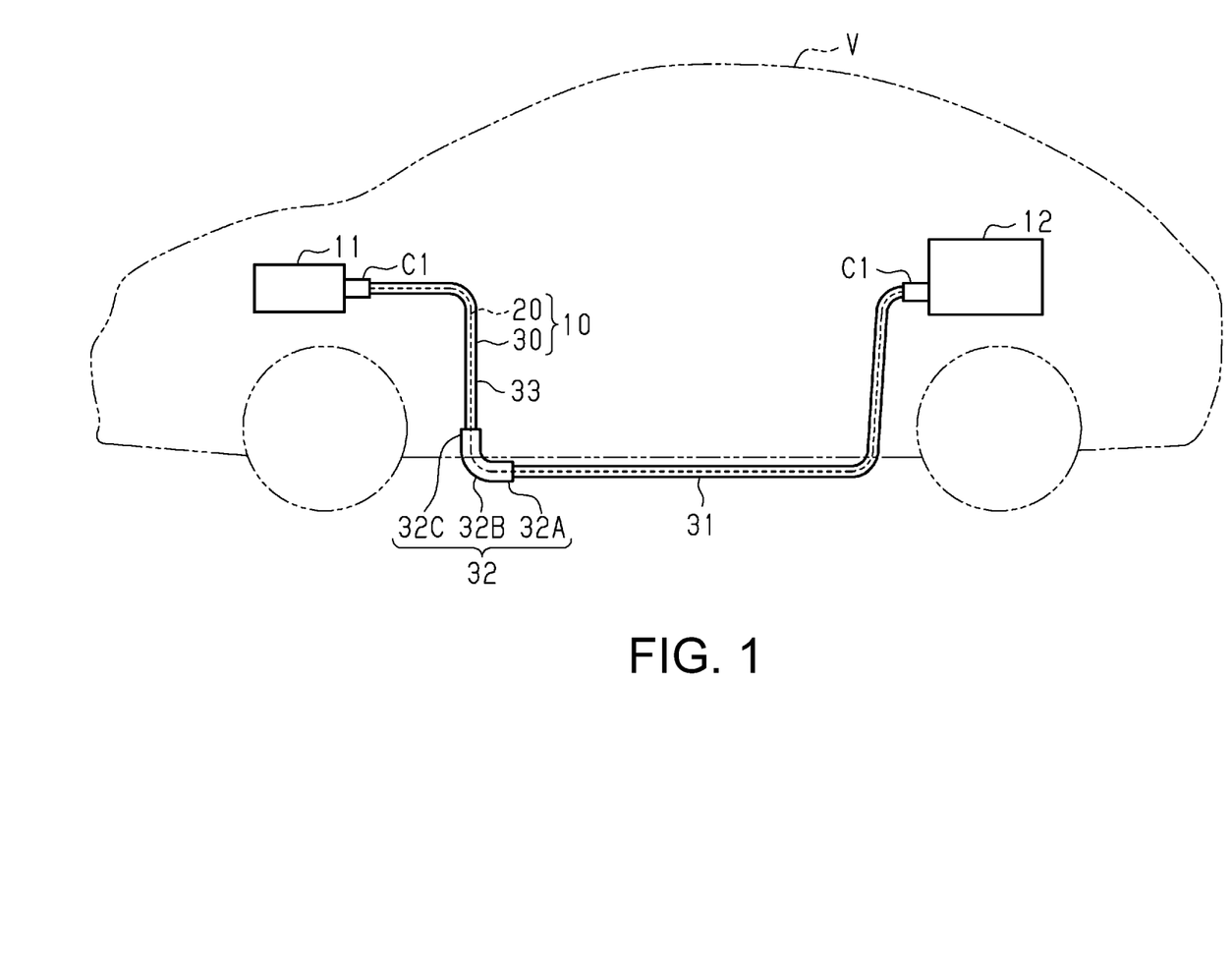
FIG. 1 is a schematic configuration diagram showing a wire harness according to an embodiment.

A wire harness 10 shown in FIG. 1 electrically connects two, three, or more electric devices (devices) to each other. For example, the wire harness 10 electrically connects an inverter 11 installed in a front portion of a vehicle V, such as a hybrid vehicle or an electric vehicle, and a high-voltage battery 12 installed rearward of the inverter 11 in the vehicle V, to each other. The wire harness 10 is routed so as to pass under the floor of the vehicle V, for example. The inverter 11 is connected to a wheel driving motor (not shown) serving as a power source for moving the vehicle. The inverter 11 generates AC power from the DC power of the high-voltage battery 12, and supplies the AC power to the motor. The high-voltage battery 12 is a battery that can supply a voltage of several hundred volts, for example.

The wire harness 10 includes one or more (two in the present embodiment) wires 20, a pair of connectors C1 respectively attached to the two ends of the electric wires 20, and an exterior member 30 (exterior tube) surrounding the outer circumferences of the electric wires 20. One end portion of each of the electric wires 20 is connected to the inverter 11 via a connector C1, and the other end portion of each of the electric wires 20 is connected to the high-voltage battery 12 via a connector C1. Each of the electric wires 20 is formed so as to be bendable into a two-dimensional shape or a three-dimensional shape, for example. For example, each of the electric wires 20 is formed by being bent into a predetermined shape according to the routing path of the wire harness 10. Each of the electric wires 20 is a high-voltage electric wire that supports high voltages and large currents, for example. Each of the electric wires 20 may be a non-shielded electric wire that does not have an electromagnetically shielded structure in itself, or a shielded electric wire that has an electromagnetically shielded structure in itself.

Figure 2:
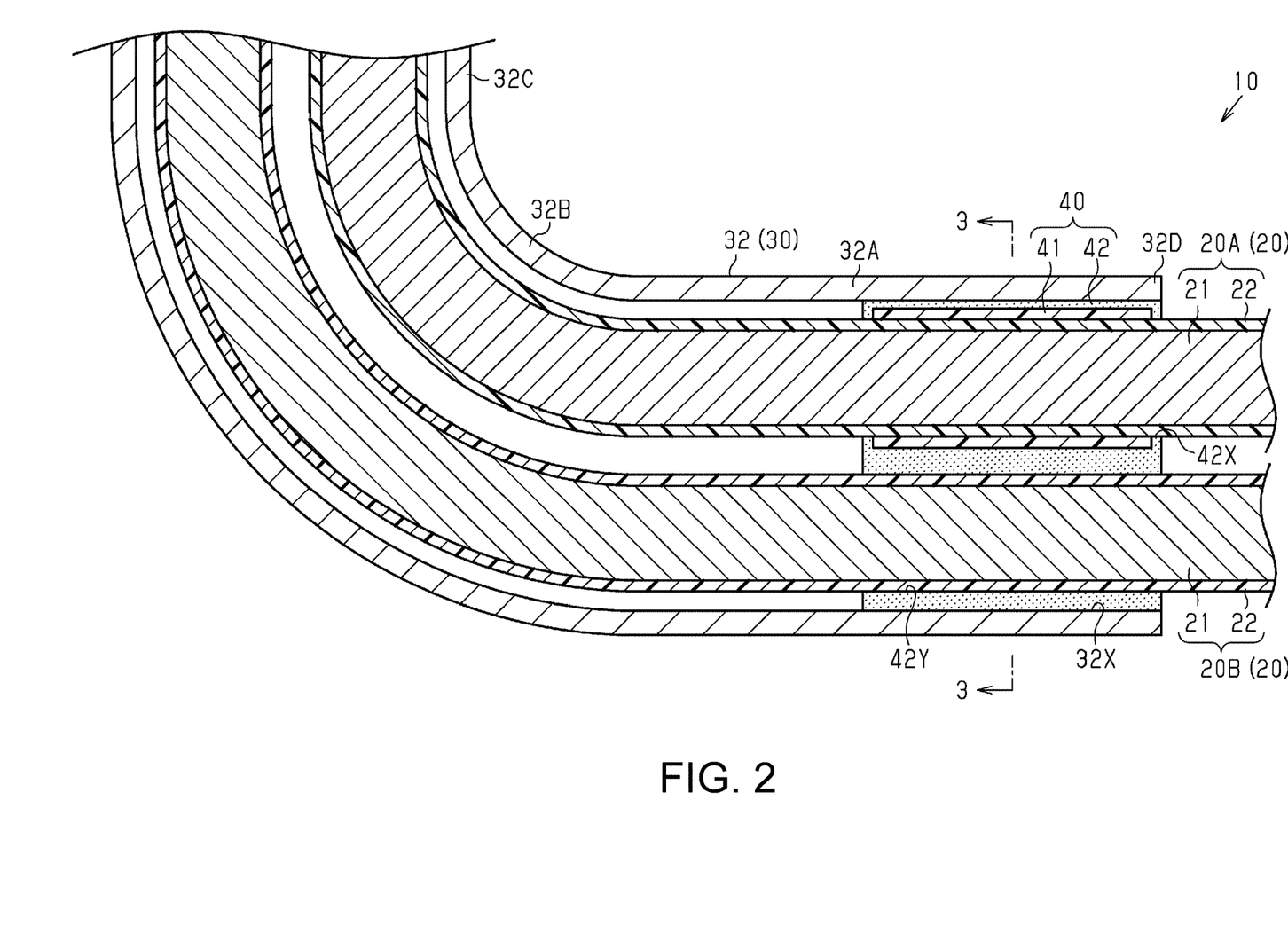
FIG. 2 is a schematic cross-sectional view showing the wire harness according to the embodiment.

As shown in FIG. 2, the electric wires 20 according to the present embodiment include two high-voltage electric wires, namely a positive-side electric wire 20A connected to a positive terminal of the high-voltage battery 12 (FIG. 1), and a negative-side electric wire 20B connected to a negative terminal of the high-voltage battery 12.

The electric wires 20A and 20B each include a core wire 21 that is made of a conductor, and an insulating coating 22 that covers the outer circumference of the core wire 21. The electric wires 20A and 20B are each formed in an elongated shape so as to extend in the front-rear direction of the vehicle, for example.

For example, a stranded wire constituted by a plurality of metal bare wires twisted together, a columnar conductor (a single core wire, a busbar, etc.) made of a single columnar metal bar that has a solid internal structure, a tubular conductor (a pipe conductor) that has a hollow internal structure, or the like can be used as the core wire 21. Also, a combination of a stranded wire, columnar conductor, and a tubular conductor may be used as the core wire 21. For example, a copper-based or aluminum-based metal material may be used as the material of the core wire 21. The core wire 21 is formed through extrusion molding, for example.

The cross-sectional shape of each core wire 21 cut along a plane that is orthogonal to the lengthwise direction of the core wire 21 (i.e., the horizontal cross-sectional shape thereof) may be any shape. A horizontal cross section of each core wire 21 is formed in a circular shape, a semicircular shape, a polygonal shape, a square shape, or a flat shape, for example. In the present description, a "flat shape" may be a rectangle, an oval, an ellipse, or the like, for example. Also, in the present description, a "rectangle" has long sides and short sides, and a square is excluded. Also, a "rectangle" in the present description may also be a shape with chamfered corners or a shape with rounded corners. A horizontal cross section of each core wire 21 in the present embodiment is formed in a circular shape.

The insulating coating 22 coats the entire outer circumferential surface of the core wire 21 so as to be in areal contact therewith. The insulating coating 22 is made of an insulating material such as a synthetic resin, for example. The insulating coating 22 may be formed by performing extrusion molding (extrusion coating) on the core wire 21, for example.

The exterior member 30 has an elongated tubular shape as a whole. The plurality of electric wires 20 are inserted into the internal space of the exterior member 30. The exterior member 30 is formed so as to surround the entire outer circumferential surfaces of the plurality of electric wires 20. The exterior member 30 protects the electric wires 20 housed therein from flying objects and water droplets. For example, a metal or resin pipe, a resin protector, a flexible corrugated tube that is made of resin or the like, a rubber waterproof cover, or a combination thereof may be used as the exterior member 30.

As shown in FIG. 1, the exterior member 30 according to the present embodiment includes a metal pipe 31, a protector 32, and a corrugated tube 33. The metal pipe 31 is provided so as to cover the electric wires 20 extending from the high-voltage battery 12 and routed under the floor of the vehicle V, for example. The protector 32 is provided so as to cover inverter 11-side portions of the electric wires 20 with respect to the metal pipe 31, for example. The protector 32 is provided so as to cover bent portions of the electric wires 20, for example. The corrugated tube 33 is provided so as to cover the portions of the electric wires 20 between the protector 32 and the inverter 11. For example, a copper-based or aluminum-based metal material may be used as the material of the metal pipe 31. For example, a conductive resin material or a non-conductive resin material may be used as the material of the protector 32 and the corrugated tube 33. For example, a synthetic resin such as polyolefin, polyamide, polyester, or ABS resin may be used as the resin material.

The protector 32 has an elongated tubular shape as a whole. The protector 32 according to the present embodiment includes a straight portion 32A that extends straight in the front-rear direction of the vehicle, a bent portion 32B that is provided at one end portion of the straight portion 32A, and a straight portion 32C that extends straight and upward of the vehicle from the bent portion 32B.

Figure 3:
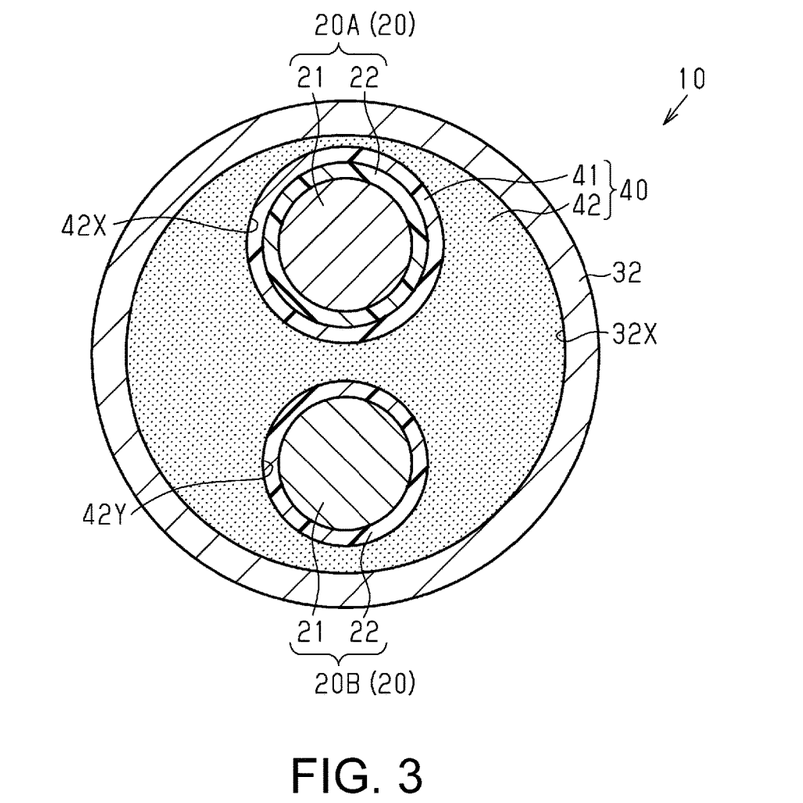
FIG. 3 is a schematic cross-sectional view (cross-sectional view taken along 3-3 in FIG. 2) showing the wire harness according to the embodiment.

As shown in FIG. 3, the protector 32 has an internal space 32X. The protector 32 according to the present embodiment is formed in a cylindrical shape. That is to say, the cross-sectional shapes of the inner circumference and the outer circumference of the protector 32 are circular shapes. A horizontal cross section of the internal space 32X of the protector 32 is formed in a circular shape. The plurality of electric wires 20 are arranged side by side in the internal space 32X of the protector 32. The electric wires 20A and 20B according to the present embodiment are arranged in the internal space 32X side by side in the top-bottom direction of the vehicle.

As shown in FIG. 2, the wire harness 10 includes a protective member 40 provided so as to fill a gap between the inner circumferential surface of the protector 32 and the outer circumferential surface of an electric wire 20. The protective member 40 is provided on an intermediate portion in the lengthwise direction of the electric wires 20A and 20B, for example. The protective member 40 is provided in the internal space 32X of the protector 32. The protective member 40 is provided in the vicinity of an end portion of the protector 32 in the lengthwise direction thereof, for example. The protective member 40 according to the present embodiment is provided in the internal space 32X in an end portion 32D that is closer to the metal pipe 31 (see FIG. 1), i.e., the end portion 32D on the rear side of the vehicle, of the end portions of the protector 32 in the lengthwise direction thereof. The protective member 40 is only provided in the straight portion 32A, of the straight portions 32A and 32C and the bent portion 32B of the protector 32, for example.

The protective member 40 includes a protective part 41 (first protective body) formed between the plurality of electric wires 20A and 20B and a protective body 42 (second protective body) formed so as to cover the outer circumferences of the electric wires 20A and 20B and the outer circumference of the protective part 41.

The protective part 41 is formed so as to cover the outer circumference of the positive-side electric wire 20A of the electric wires 20A and 20B, for example. The protective part 41 according to the present embodiment has a tubular shape, and coats the entire outer circumference of the electric wire 20A, for example. Therefore, the protective part 41 is provided so as to be interposed between the plurality of electric wires 20A and 20B, and to separate the plurality of electric wires 20A and 20B from each other. The protective part 41 is provided on a portion, namely an intermediate portion, of the electric wire 20A in the lengthwise direction thereof, for example. The protective part 41 is provided in the internal space 32X of the protector 32. The protective part 41 is constituted by a plurality of reinforced fibers that have excellent insulation properties and shear resistance properties. The protective part 41 according to the present embodiment is formed by braiding a plurality of reinforced fibers into a tubular shape. The protective part 41 is more flexible than the core wire 21 is, for example.

Examples of the reinforced fibers constituting the protective part 41 include para-aramid fibers, polyarylate fibers, PBO (polyp araphenylene benzobisoxazole) fibers, PET (polyethylene terephthalate) fibers, ultrahigh molecular weight polyethylene fibers, PEI (polyetherimide) fibers, glass fibers, and ceramic fibers. It is preferable to use one or more kinds of the aforementioned fibers according to the physical properties that are required of the protective part 41 as the reinforced fibers constituting the protective part 41. In the present embodiment, the protective part 41 is constituted by only one type of fiber, namely para-aramid fibers.

In the present embodiment, the protective part 41 is not provided for the negative-side electric wire 20B of the electric wires 20A and 20B. That is to say, the protective part 41 according to the present embodiment is only provided on the outer circumference of the positive-side electric wire 20A of the electric wires 20A and 20B.

The protective body 42 is formed so as to fill the gap between the inner circumferential surface of the protector 32 and the outer circumferential surfaces of the electric wires 20A and 20B and the protective part 41. The protective body 42 is formed so as to collectively cover the outer circumferences of the plurality of electric wires 20A and 20B.

As shown in FIG. 3, the protective body 42 is formed so as to cover the entire outer circumference of each of the electric wires 20A and 20B, for example. The protective body 42 is in areal contact with the entire outer circumferential surface of each of the electric wires 20A and 20B, for example. The protective body 42 is formed so as to cover the entire outer circumference of the protective part 41, for example. The protective body 42 is in close contact with the entire outer circumferential surface of the protective part 41, for example. The protective body 42 is formed so as to enter the mesh of the protective part 41, for example. The protective body 42 is formed so as to fill the mesh of the protective part 41, for example. The protective body 42 is in areal contact with the outer circumferential surface of the electric wire 20A exposed from the mesh of the protective part 41, for example. In other words, the protective part 41 and the electric wires 20A and 20B are formed so as to be embedded in the protective body 42.

As shown in FIG. 2, the protective body 42 according to the present embodiment is formed so as to cover the entire length of the outer circumference of the protective part 41 in the lengthwise direction of the protective part 41. The protective body 42 is formed so as to cover open end portions of the tubular protective part 41 (i.e., both end portions of the protective part 41 in the lengthwise direction thereof) from the outside in the lengthwise direction of the protective part 41. The protective body 42 is in areal contact with the open end surfaces of the protective part 41. In other words, in the present embodiment, the protective part 41 is entirely embedded in the protective body 42.

As shown in FIG. 3, the outer circumferential surface of the protective body 42 is in areal contact with the inner circumferential surface of the protector 32, for example. The outer circumferential surface of the protective body 42 is in areal contact with the entire inner circumferential surface of the protector 32, for example. A horizontal cross section of the protective body 42 has substantially the same shape and substantially the same size as the horizontal cross section of the internal space 32X of the protector 32.

In other words, the protector 42 according to the present embodiment is formed in a cylindrical shape. The protective body 42 is provided with a plurality of through holes 42X and 42Y that extend in the lengthwise direction of the protective body 42 (i.e., the direction in which the electric wires 20A and 20B are inserted). The electric wire 20A is inserted into the through hole 42X, and the protective part 41 is also housed therein. The electric wire 20B is inserted into the through hole 42Y. The protective body 42 also serves as a positioning member for holding the electric wires 20A and 20B at the same positions in the internal space 32X of the protector 32.

For example, a material with excellent flexibility such as silicon or rubber may be used as the material of the protective body 42. For example, a highly thermally conductive material that has a higher thermal conductivity than the air layer may be used as the material of the protective body 42. For example, a material formed by including a filler having a high thermal conductivity in an insulating resin such as a polyimide resin, an epoxy resin, or a silicone resin, or silicone rubber may be used as the highly thermally conductive material. A filler made of a metal material such as gold (Au), silver (Ag), copper (Cu), aluminum (Al), nickel (Ni), chromium (Cr), or cobalt (Co), or a filler formed by coating the surface of a metal material with an insulating material (for example, a resin material) may be used as the filler. When a highly thermally conductive material is used as the material of the protective body 42, the protective body 42 may serve as a thermal conductive member. Also, for example, a solid or gel-like (semi-solid) material may be used as the material of the protective body 42.

Next, an example of a method for manufacturing the wire harness 10 will be described.

First, the plurality of electric wires 20A and 20B and the tubular protective part 41 are prepared. Next, the electric wire 20A is inserted into the tubular protective part 41, and the protective part 41 that covers the outer circumference of an intermediate portion of the electric wire 20A in the lengthwise direction thereof is formed. Next, the protective body 42 is formed that collectively covers the protective part 41 and the electric wires 20A and 20B. The protective body 42 may be formed through molding, for example. By forming the protective body 42, the plurality of electric wires 20A and 20B are tied together. Next, the electric wires 20A and 20B on which the protective part 41 and the protective body 42 are formed are inserted into the protector 32. At this time, the protective body 42 is pressed into the protector 32, for example. As a result, the gap between the inner circumferential surface of the protector 32 and the outer circumferential surfaces of the electric wires 20A and 20B and the protective part 41 is filled by the protective body 42.

Note that the method for forming the protective body 42 is not limited to this method. For example, after inserting the plurality of electric wires 20A and 20B into the protector 32, a gel-like material may be injected so as to fill the gap between the inner circumferential surface of the protector 32 and the outer circumferential surfaces of the plurality of electric wires 20A and 20B, to form the protective body 42.

Next, the actions and effects of the present embodiment will be described.

(1) The protective body 42 is provided so as to fill the gap between the inner circumferential surface of the protector 32 and the outer circumferential surfaces of the plurality of electric wires 20. As a result, foreign objects such as water and sand are desirably prevented from entering the internal space 32X of the protector 32, which is located inward of the protective body 42. Therefore, it is possible to desirably protect the electric wires 20.

(2) The protective part 41 that has excellent impact resistance properties (particularly, shear resistance properties), which is formed by braiding reinforced fibers such as para-aramid fibers, is provided between the plurality of electric wires 20A and 20B. Therefore, even if the protector 32 is damaged on impact at the time of a vehicle collision, for example, the core wires 21 of the electric wires 20A and 20B can be prevented from coming into direct contact with each other or being electrically connected via any conductor such as a component of the vehicle.

(3) The protective part 41 is provided on only some, i.e., the electric wire 20A, of the plurality of electric wires 20A and 20B, and therefore an increase in the manufacturing cost of the wire harness 10 can be suppressed.

(4) The protective body 42 is formed so as to cover the outer circumference of the protective part 41. As a result, the function of preventing foreign objects such as water and sand from entering the internal space 32X and the function of improving the impact resistance properties can be provided at one location in the internal space 32X of the protector 32. Therefore, it is possible to contribute to downsizing the internal space 32X of the protector 32.

(5) When the protective part 41 is lead out of the protective body 42 from the end surfaces of the protective body 42, a gap is likely to be formed between the inner circumferential surface of the protective body 42 and the outer circumferential surface of the protective part 41. Therefore, in the present embodiment, the protective body 42 is formed so as to cover the entire length of the outer circumference of the protective part 41. That is to say, the protective part 41 is not led out of the protective body 42. Therefore, it is possible to desirably prevent a gap from being formed between the inner circumferential surface of the protective body 42 and the outer circumferential surface of the protective part 41. As a result, it is possible to desirably prevent foreign objects such as water and sand from entering the internal space 32X of the protector 32.

(6) The protective body 42 is provided in the end portion 32D of the protector 32 in the lengthwise direction thereof. With this configuration, compared to the case in which the protective body 42 is provided in a central portion of the protector 32 in the lengthwise direction thereof, the protective body 42 provided in the end portion 32D more desirably prevents water and sand are more from entering the internal space 32X of the protector 32.

(7) The protective body 42 is only provided in the straight portion 32A of the protector 32. In other words, the protective body 42 is not provided in the bent portion 32B of the protector 32. With this configuration, it is possible to improve workability when the protective body 42 is to be inserted into the protector 32.

(8) The protective body 42 is made of a material that has a higher thermal conductivity than the air layer. With this configuration, the protective body 42 that is made of a material that has a higher thermal conductivity than the air layer can be provided between the outer circumferential surfaces of the electric wires 20 and the inner circumferential surface of the protector 32. With this configuration, it is possible to set an air layer (i.e., an insulation layer) between the electric wires 20 and the protector 32 so as to be small, and accordingly, it is possible to reduce the thermal resistance between the outer circumferential surfaces of the electric wires 20 and the inner circumferential surface of the protector 32. Therefore, it is possible to efficiently dissipate heat generated by the electric wires 20, and improve the heat dissipation properties of the wire harness 10.

(9) Furthermore, the protective body 42 is formed so as to fill the mesh of the protective part 41. With this configuration, it is possible to increase the contact area of the protective body 42 and the protective part 41. Also, it is possible to bring the outer circumferential surfaces of the electric wires 20 exposed from the mesh of the protective part 41 into contact with the protective body 42, and therefore it is also possible to increase the contact area of the protective body 42 and the electric wires 20. As a result, it is possible to reduce the thermal resistance between the protective body 42 and the protective part 41, and the protective body 42 and the electric wires 20, and therefore it is possible to improve the heat dissipation properties of the wire harness 10.

Other Embodiments

The above-described embodiment may be modified as described below and implemented. The above-described embodiment and the following modifications may be combined with each other and implemented as long as there is no technical contradiction.

Although one protective member 40 is provided in the internal space 32X of the protector 32 in the above-described embodiment, the number of protective members 40 is not specifically limited.

Figure 4:
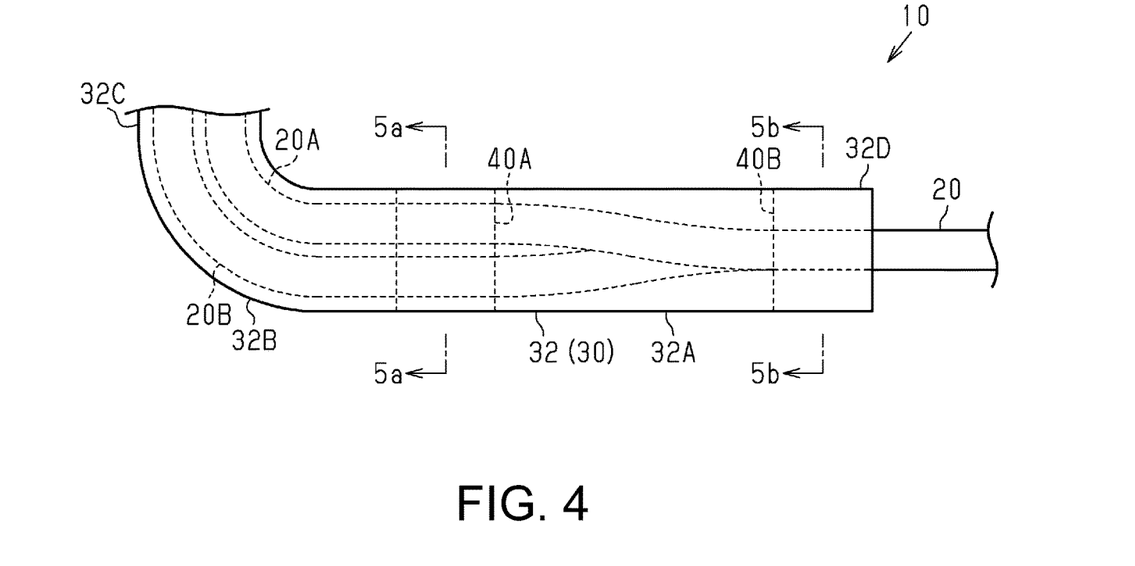
FIG. 4 is a schematic configuration diagram showing a wire harness according to a modification.

For example, as shown in FIG. 4, two or more (two in this example) protective member 40A and 40B may be provided in the protector 32. In this modification, the two protective members 40A and 40B are provided in the straight portion 32A of the protector 32. The protective member 40A is provided in the straight portion 32A near the bent portion 32B of the protector 32. That is to say, the protective member 40A is provided in an intermediate portion of the protector 32 in the lengthwise direction thereof. The protective member 40B is provided in the end portion 32D of the protector 32 in the lengthwise direction thereof. In the example shown in the figure, the protective member 40A and the protective member 40B are not in contact with each other, and are separated in the lengthwise direction of the protector 32.

Figure 5A:
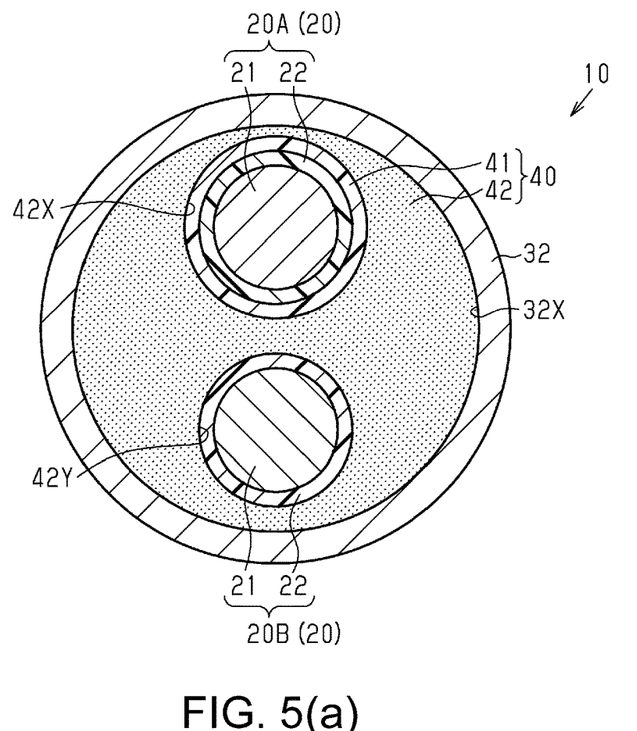
FIG. 5(a) is a schematic cross-sectional view (cross-sectional view taken along 5a-5a in FIG. 4) showing a wire harness according to a modification.
Figure 5B:
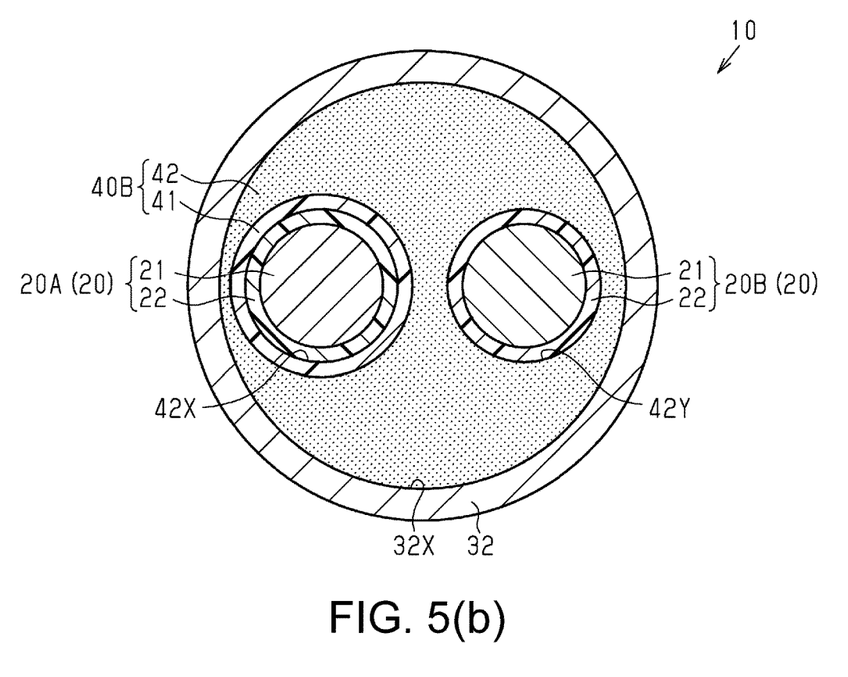
FIG. 5(b) is a schematic cross-sectional view (cross-sectional view taken along 5b-5b in FIG. 4) showing a wire harness according to a modification.

In this case, as shown in FIGS. 5(a) and 5(b), the through holes 42X and 42Y of the protective bodies 42 in the protective members 40A and 40B may be set so as to be displaced from each other in a horizontal cross section. For example, as shown in FIG. 5(a), the through holes 42X and 42Y of the protective body 42 in the protective member 40A may be provided so as to be lined up in the top-bottom direction of the vehicle. In contrast, as shown in FIG. 5(b), the through holes 42X and 42Y of the protective body 42 in the protective member 40B may be provided so as to be lined up in the left-right direction of the vehicle. That is to say, in the present modification, the through holes 42X and 42Y of the protective member 40A and the through holes 42X and 42Y of the protective member 40B are set at positions that are shifted by approximately 90 degrees from each other. With this configuration, as shown in FIG. 4, the electric wires 20A and 20B can be twisted between the protective members 40A and 40B, and the state in which the electric wires 20A and 20B are twisted can be desirably kept by the protective members 40A and 40B. As a result, it is possible to improve the flexibility of the routing layout of the electric wires 20A and 20B.

The protective member 40 may be provided in the straight portion 32C of the protector 32 of the above-described embodiment. For example, the protective member 40 may be provided in the end portion of the protector 32 that is closer to the corrugated tube 33, of the end portions of the protector 32 in the lengthwise direction thereof.

Although the protective member 40 is provided in the end portion 32D of the protector 32 in the lengthwise direction thereof, the present disclosure is not limited in this way. For example, the protective member 40 may be provided in an intermediate portion of the protector 32 in the lengthwise direction thereof.

The protective member 40 may be provided in the bent portion 32B of the protector 32 of the above-described embodiment.

Although the protective part 41 is only provided for the electric wire 20A of the electric wires 20A and 20B in the above-described embodiment, the present disclosure is not limited in this way.

Figure 6:
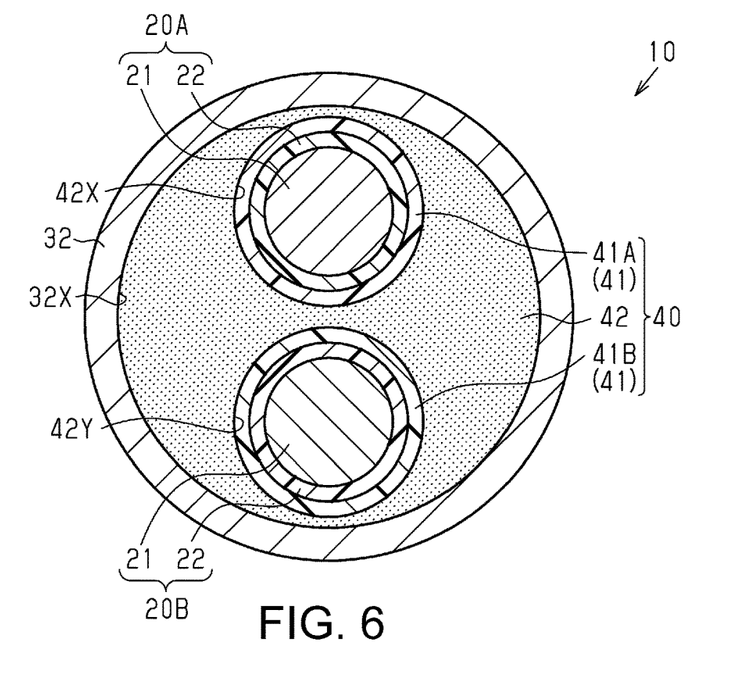
FIG. 6 is a schematic cross-sectional view showing a wire harness according to a modification.

For example, as shown in FIG. 6, the protective part 41 may be provided for both the electric wires 20A and 20B. In this case, the outer circumferences of the electric wires 20A and 20B are respectively coated with the individual protective parts 41. That is to say, the protective member 40 in the present modification includes a protective part 41A that covers the entire outer circumference of the electric wire 20A and a protective part 41B that covers the entire outer circumference of the electric wire 20B. Also, the protective body 42 in the present modification is formed so as to cover the outer circumferences of the two electric wires 20A and 20B and the outer circumferences of the two protective parts 41A and 41B.

In the above-described embodiment, the protective part 41 is formed in a tubular shape that coats the entire outer circumference of the electric wire 20A. However, the present disclosure is not limited to such a configuration, and, for example, the protective part 41 may be formed into a non-tubular shape. The protective part 41 in this case is provided between the plurality of electric wires 20A and 20B so as to separate the plurality of electric wires 20A and 20B from each other. That is to say, the shape of the protective part 41 is not specifically limited as along as it has a configuration that can keep insulating the plurality of electric wires 20A and 20B from each other.

Figure 7:
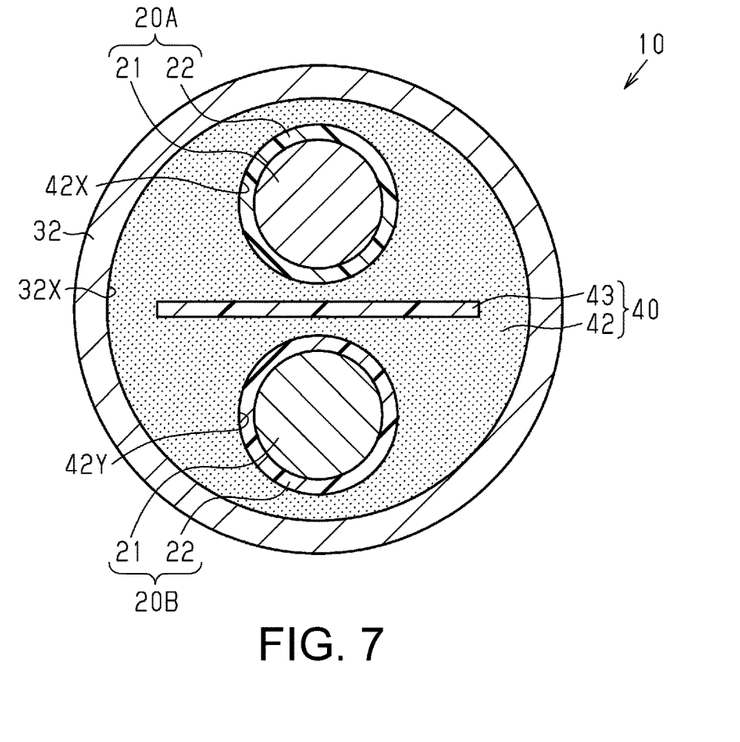
FIG. 7 is a schematic cross-sectional view showing a wire harness according to a modification.

As shown in FIG. 7, for example, a protective part 43 may be formed so as to have a straight horizontal cross-sectional shape. That is to say, a sheet-shaped protective part 43 may be provided between the plurality of electric wires 20A and 20B. For example, the protective part 43 is provided between the plurality of electric wires 20A and 20B, and is formed so as to extend straight in a direction (the left-right direction in the figure) that intersects the direction in which the plurality of electric wires 20A and 20B are arranged side by side (the top-bottom direction in the figure). Note that, as with the protective part 41, the protective part 43 is constituted by a plurality of reinforced fibers.

Figure 8:
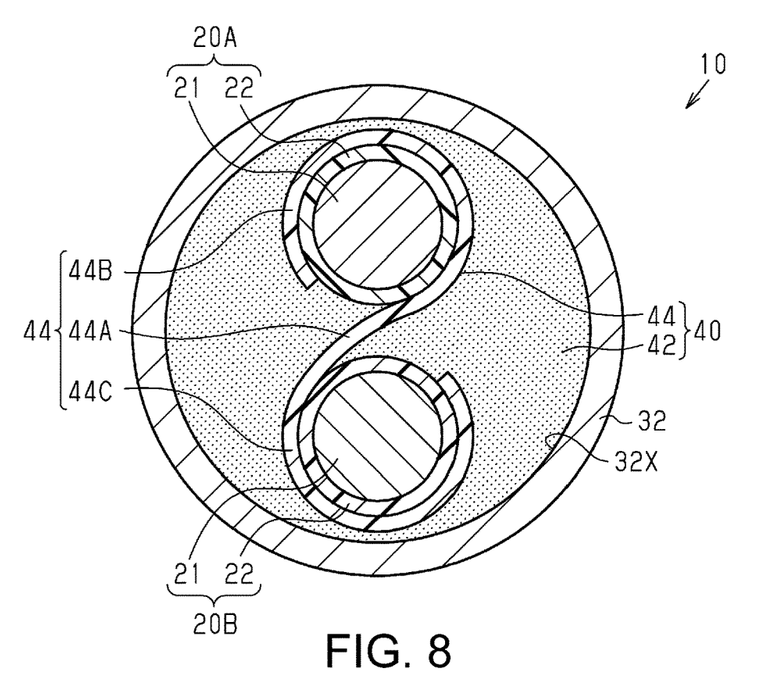
FIG. 8 is a schematic cross-sectional view showing a wire harness according to a modification.

As shown in FIG. 8, for example, a cross section of a protective part 44 may be formed in an S shape. For example, a sheet-shaped protective part 44 may be wound around the plurality of electric wires 20A and 20B so as to have an S-like horizontal cross-sectional shape. For example, the protective part 44 includes a partition portion 44A that is formed between the plurality of electric wires 20A and 20B, and a pair of housing portions 44B and 44C that are provided so as to sandwich the partition portion 44A. The housing portions 44B and 44C are formed in a non-tubular shape so as to be open in one direction in a horizontal cross section. The housing portions 44B and 44C are formed so as to be open toward the partition portion 44A. The housing portion 44B houses the electric wire 20A, and the housing portion 44C houses the electric wire 20B. Note that, as with the protective part 41, the protective part 44 is constituted by a plurality of reinforced fibers.

Figure 9:
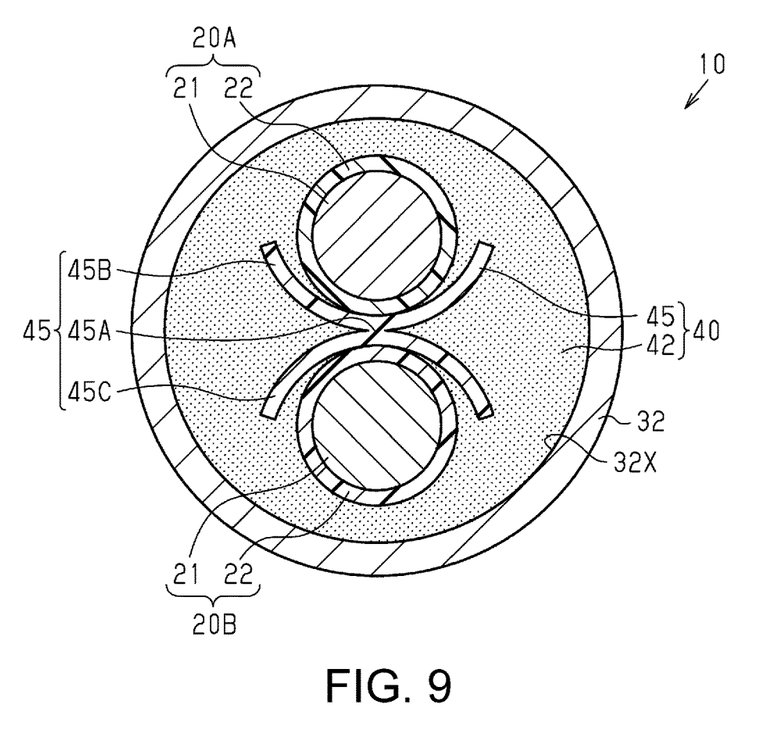
FIG. 9 is a schematic cross-sectional view showing a wire harness according to a modification.

For example, as shown in FIG. 9, a horizontal cross section of a protective part 45 may be formed in an X shape. For example, the protective part 45 includes a partition portion 45A that is formed between the plurality of electric wires 20A and 20B, and a pair of housing portions 45B and 45C that are formed so as to include the partition portion 45A. The housing portions 45B and 45C are formed in a non-tubular shape so as to be open in one direction in a horizontal cross section. A horizontal cross section of each of the housing portions 45B and 45C is formed in a C shape, for example. The housing portions 45B and 45C are formed so as to be open in the opposite directions. The housing portion 45B houses the electric wire 20A, and the housing portion 45C houses the electric wire 20B. Note that, as with the protective part 41, the protective part 45 is constituted by a plurality of reinforced fibers.

Other examples of the horizontal cross-sectional shape of the non-tubular protective part include a C shape, an E shape, and an H shape.

The above-described protective parts 43, 44, and 45 are formed in a non-tubular shape, and therefore, the protective parts 43, 44, and 45 can be easily arranged between the plurality of electric wires 20A and 20B compared to when a tubular protective part 41 is fit onto the electric wires 20. The protective body 42 shown in FIGS. 7 to 9 is formed so as to cover the outer circumference of the non-tubular protective part 43, 44, or 45. This protective body 42 also serves as a holding member for holding the protective part 43, 44, or 45 at a position between the plurality of electric wires 20A and 20B.

Although the protective body 42 is formed so as to coat the entire length of the outer circumference of the protective part 41 in the lengthwise direction of the protective part 41 in the above-described embodiment, the present disclosure is not limited in this way. For example, the protective part 41 may be led out of the end surfaces of the protective body 42. That is to say, the protective body 42 may be formed so as to coat only a portion of the outer circumference of the protective part 41 in the lengthwise direction of the protective part 41. For example, the protective part 41 may be formed so as to cover substantially the entire length of the outer circumferences of the electric wires 20 in the lengthwise direction of the electric wires 20.

The protector 32 according to the above-described embodiment may have a structure without a bent portion. That is to say, the protector 32 may have a structure that only includes a straight portion.

The protector 32 in the above-described embodiment may be modified so as to be a structure that is formed by combining a plurality of divided tubular portions.

In the above-described embodiment, the protective member 40 is provided in the internal space 32X of the protector 32, which is one part of the exterior member 30 into which the electric wires 20 are inserted. However, the present disclosure is not limited in this way, and the protective member 40 may be provided in the internal space of another part of the exterior member 30 such as the metal pipe 31 or the corrugated tube 33.

Although not specifically mentioned in the above-described embodiment, a configuration in which an electromagnetic shield member is provided inside the protector 32 may be employed. The electromagnetic shield member is provided so as to collectively enclose the plurality of electric wires 20, for example. The electromagnetic shield member is provided between the inner circumferential surface of the protector 32 and the outer circumferential surfaces of the electric wires 20, for example. A portion of the outer circumference of the electromagnetic shield member is coated with the protective body 42 of the protective member 40, for example. For example, a flexible braided wire or a piece of metal foil may be used as the electromagnetic shield member. Also, a braided wire braided by combining a metal bare wire and a resin bare wire may be used as the electromagnetic shield member. For example, a reinforced fiber that has excellent insulation properties and shear resistance properties such as a para-aramid fiber may be used as the resin bare wire.

Although the protector 32 is formed in a substantially true cylindrical shape, the present disclosure is not limited in this way, and the protector 32 may be formed in an elliptical tube shape or a square tube shape.

Although the number of electric wires 20 inserted into the exterior member 30 is two in the above-described embodiment, the number of electric wires 20 is not specifically limited and may be changed according to the specifications of the vehicle. For example, the number of electric wires inserted into the exterior member 30 may also be one, three, or more. For example, it is possible to employ a configuration to which a low-voltage electric wire for connecting a low-voltage battery and various low-voltage devices (for example, a lamp, a car audio, etc.) is added as an electric wire inserted into the exterior member 30.

In the above-described embodiment, the exterior member 30 that includes the metal pipe 31, the protector 32, and the corrugated tube 33 is embodied. The present disclosure is not limited in this way, and it is possible to employ a configuration in which the metal pipe 31 is not included in the exterior member 30 or a configuration in which the metal pipe 31 and the protector 32 are not included therein, i.e., a configuration in which only the corrugated tube 33 is included. Also, the metal pipe 31, the protector 32, and the corrugated tube 33 may each be replaced with another exterior member. For example, the metal pipe 31 may be replaced with a resin pipe.

The positional relationship between the inverter 11 and the high-voltage battery 12 in the vehicle V is not limited to that in the above-described embodiment, and may be changed according to the vehicle configuration when necessary.

Figure 10:
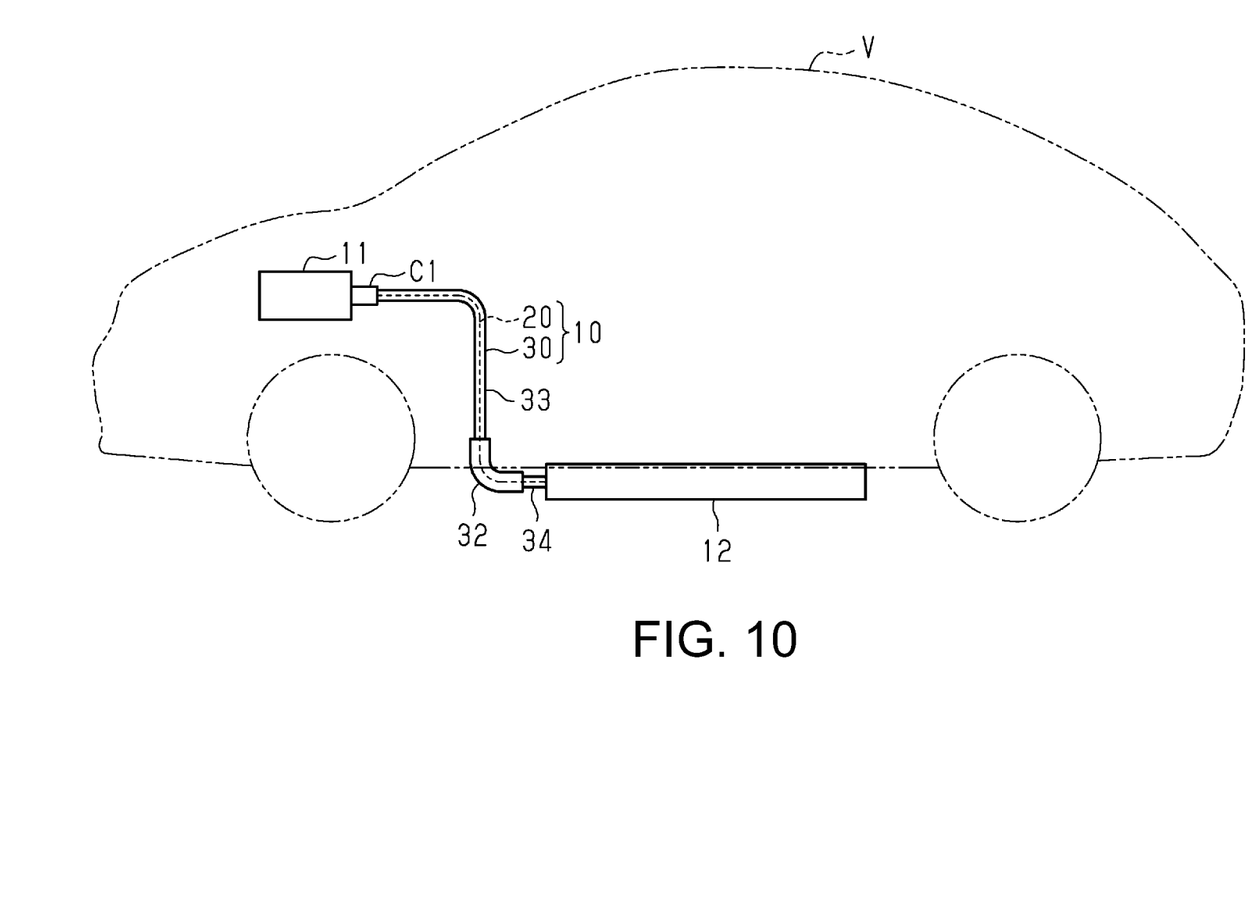
FIG. 10 is a schematic configuration diagram showing a wire harness according to a modification.

For example, as shown in FIG. 10, the high-voltage battery 12 may be disposed along substantially the entire floor of the vehicle V, and a wire harness 10 that electrically connects the high-voltage battery 12 and the inverter 11 may be embodied. Note that the example shown in FIG. 10 is not provided with the metal pipe 31 in the exterior member, and a corrugated tube 34 is provided between the high-voltage battery 12 and the protector 32.

Although the inverter 11 and the high-voltage battery 12 are employed as electric devices connected by the wire harness 10 in the above-described embodiment, the present disclosure is not limited in this way. For example, the present disclosure may be applied to electric wires that connect the inverter 11 and a motor for driving the vehicle to each other. That is to say, the present disclosure is applicable to whatever electrically connects electric devices mounted in the vehicle to each other.

The present disclosure includes the following examples of implementation. The reference numerals for the components of the embodiment are added in order to facilitate understanding, not to limit the present disclosure.

[Supplementary Note 1] A wire harness (10) according to one or more implementation examples of the present disclosure may include:

an exterior member (30) that is tubular and has an open end and an inner surface that forms an internal space (32X);

a first electric wire (20A) and a second electric wire (20B) that are inserted into the internal space (32X) of the exterior member (30), and each extend outward from the open end of the tubular exterior member (30) in an axial direction of the wire harness (10);

a protective plug or cap (42) that is pressed into the internal space (32X) of the tubular exterior member (30) from the open end of the tubular exterior member (30), the protective plug or cap (42) being an elastic member that has a first axial end surface that is provided near the open end of the tubular exterior member (30), a second axial end surface that is located opposite to the first axial end surface, and an outer surface that is in close contact with an entire circumference of the inner surface of the tubular exterior member (30); and an insulating flexible protective sheet (41, 43, 44, 45) that is entirely embedded in the protective plug or cap (42), wherein the insulating flexible protective sheet (41, 43, 44, 45) is configured to extend between the first electric wire (20A) and the second electric wire (20B) inside the protective plug or cap (42) to prevent the first electric wire (20A) and the second electric wire (20B) from coming into direct contact with each other.

[Supplementary Note 2] According to some implementation examples, the first electric wire (20A) has a first outer surface portion inside the protective plug or cap (42), the second electric wire (20B) has a second outer surface portion inside the protective plug or cap (42), and the first outer surface portion of the first electric wire (20A) and the second outer surface portion of the second electric wire (20B) form a shortest distance between the first electric wire (20A) and the second electric wire (20B) when viewed in a cross section that is orthogonal to an axis of the wire harness (10), and the insulating flexible protective sheet (41, 43, 44, 45) may include a first sheet-shaped portion that is laid out between the first outer surface portion of the first electric wire (20A) and the second outer surface portion of the second electric wire (20B) when viewed in a cross section that is orthogonal to the wire harness (10).

[Supplementary Note 3] According to some implementation examples, the insulating flexible protective sheet (41, 43, 44, 45) may be constituted by an insulating reinforced fiber.

[Supplementary Note 4] According to some implementation examples, the insulating flexible protective sheet (41, 43, 44, 45) may have a first axial end portion that is close to the open end of the tubular exterior member (30), and a second axial end portion that is opposite to the first axial end portion, and the protective plug or cap (42) may be configured to seal the first axial end portion and the second axial end portion of the tubular exterior member (30) so as to be watertight.

[Supplementary Note 5] According to some implementation examples, the insulating flexible protective sheet (41, 43, 44, 45) may be configured to diffuse or disperse an impact applied inward in a radial direction from the tubular exterior member (30) toward a local portion of the first electric wire (20A) and/or a local portion of the second electric wire (20B), in an axial direction and/or a circumferential direction.

[Supplementary Note 6] According to some implementation examples, the protective plug or cap (42) may occupy an empty space that is not occupied by the first electric wire (20A), the second electric wire (20B), or the reinforced fiber of the insulating flexible protective sheet (41, 43, 44, 45) in the internal space (32X) of the tubular exterior member (30) when viewed in a cross section that is orthogonal to the wire harness (10).

[Supplementary Note 7] According to some implementation examples, the protective plug or cap (42) may be configured to prevent water and a solid foreign object from entering the tubular exterior member (30) from the open end of the tubular exterior member (30).

[Supplementary Note 8] According to some implementation examples, the protective plug or cap (42) may seal the entire outermost edge of the insulating flexible protective sheet (41, 43, 44, 45) so as to prevent water from travelling along the surface of, or travelling through an inside of, the insulating flexible protective sheet (41, 43, 44, 45) from the opening end of the tubular exterior member (30) to an inside of the tubular exterior member (30).

[Supplementary Note 9] According to some implementation examples, the protective plug or cap (42) may be constituted by a shock absorbing cushioning member that absorbs or mitigates an impact that is applied inward in a radial direction from the tubular exterior member (30) toward the insulating flexible protective sheet (41, 43, 44, 45), the first electric wire (20A), and the second electric wire (20B).

[Supplementary Note 10] According to some implementation examples, the first axial end surface of the protective plug or cap (42) may be flush with the open end of the tubular exterior member (30).

It will be apparent to those skilled in the art that the present disclosure may be embodied in another specific form without departing from the technical idea thereof. For example, at least one of the components described in the embodiment (or one or more variations thereof) may be omitted, or some of those components may be combined. The scope of the present disclosure should be determined with reference to the appended claims, along with the full scope of equivalents to which such claims are entitled.

The invention claimed is:

1. A wire harness comprising:
a plurality of electric wires;
an exterior tube that has an internal space into which the plurality of electric wires are inserted;
a first protective body that is insulative, is provided between the plurality of electric wires in the internal space of the exterior tube, and is formed with an insulating reinforced fiber; and
a second protective body that is provided so as to fill a gap between an inner circumferential surface of the exterior tube and outer circumferential surfaces of the plurality of electric wires, and covers an outer circumference of the first protective body and outer circumferences of the plurality of electric wires,
wherein the first protective body is shorter than the second protective body in a side view of the wire harness.

2. The wire harness according to claim 1,
wherein the first protective body is formed in a non-tubular shape so as to separate the plurality of electric wires from each other.

3. The wire harness according to claim 2,
wherein a horizontal cross section of the first protective body is formed in a straight shape, an S shape, or an X shape.

4. The wire harness according to claim 1,
wherein the first protective body is formed in a tubular shape that covers entire outer circumferences of the electrical wires.

5. The wire harness according to claim 1,
wherein the second protective body is formed so as to cover an entire length of the outer circumference of the first protective body in a lengthwise direction of the first protective body.

6. The wire harness according to claim 1,
wherein the second protective body is provided in an end of the exterior tube in a lengthwise direction thereof.

7. The wire harness according to claim 1, wherein:
the exterior tube includes a straight portion and a bent portion, and
the second protective body is only provided in the straight portion of the straight portion and the bent portion.

8. The wire harness according to claim 1, wherein:
the second protective body is made of a material that has a higher thermal conductivity than an air layer.

9. The wire harness according to claim 8, wherein:
the first protective body is formed by braiding a plurality of reinforced fibers, and
the second protective body is formed so as to fill a mesh of the first protective body.

10. The wire harness according to claim 1,
wherein the first protective body is entirely embedded in the second protective body.

* * * * *